United States Patent [19]

Klopfer et al.

[11] Patent Number: 5,790,171
[45] Date of Patent: Aug. 4, 1998

[54] VIDEO DIAL TONE NETWORK SYNCHRONIZATION

[75] Inventors: Frank Klopfer, Bowie; Amos Lucas, Baltimore; David Little, Columbia; Lisa M. Sprangel, Laurel, all of Md.

[73] Assignee: Bell Atlantic Network Services, Inc., Arlington, Va.

[21] Appl. No.: 575,874

[22] Filed: Dec. 22, 1995

[51] Int. Cl.$^6$ ........................................ H04N 7/10
[52] U.S. Cl. ............................ 348/6; 348/7; 370/397; 370/503
[58] Field of Search ...................... 348/6, 7, 12, 13, 348/500; 370/397, 503; 375/356

[56] References Cited

U.S. PATENT DOCUMENTS

| | | |
|---|---|---|
| 5,027,400 | 6/1991 | Baji et al. |
| 5,108,447 | 4/1992 | Farry et al. ........................ 348/7 |
| 5,247,347 | 9/1993 | Litteral et al. |
| 5,260,783 | 11/1993 | Dixit |
| 5,543,951 | 8/1996 | Moehrmann ................... 370/503 |
| 5,583,863 | 12/1996 | Darr, Jr. et al. ................... 370/397 |
| 5,592,477 | 1/1997 | Farris et al. .................... 370/396 |
| 5,600,632 | 2/1997 | Schulman ........................ 370/503 |
| 5,627,836 | 5/1997 | Conoscenti et al. ............. 320/397 |
| 5,666,253 | 9/1997 | Metz et al. ...................... 395/200.5 |
| 5,666,487 | 9/1997 | Goodman et al. ............... 395/200.76 |

*Primary Examiner*—Victor R. Kostak
*Attorney, Agent, or Firm*—Lowe, Price, LeBlanc & Becker

[57] ABSTRACT

A digital communications system efficiently transports communications data in ATM format from a plurality of information providers to a plurality of users, maximizing transport of the supply of ATM streams to distribution paths in a network. A video tone dial network arrangement synchronizes the timing among various VIP source multiplexers and super trunk transmitters. ATM streams are transported through an ATM backbone network and a local loop distribution network. A serving node, or host digital terminal, of the local loop distribution network, supplies the bit stream carrying ATM cells for a video program to the user terminal and provides information necessary to permit the terminal to decode the data from the ATM cells carrying the program information.

19 Claims, 5 Drawing Sheets ns to digital broadband networks and more particularly to delivery of a plurality of digital sources in an efficiently coordinated and synchronized manner.

BACKGROUND ART

The delivery of full motion video programming has progressed from early television broadcasting and cable distribution networks to a wide variety of distribution arrangements, including direct broadcast satellite television. The number of video sources has proliferated greatly, in response to increased usage and user demand for a greater range of subject matter content. More robust networks have evolved in an attempt to meet user requirements.

For example, Litteral et al. U.S. Pat. No. 5,247,347 discloses a digital video distribution network providing subscribers with access to multiple Video On Demand service providers through the public switched telephone network. Systems such as described by Litteral et al., however, are limited. The Litteral et al. system relies on digital cross connect switching to multiplexers that supply a single broadband channel to a subscriber's premises via the subscriber's twisted wire pair telephone line. While the resulting single channel, point-to-point transmissions are effective for interactive type services, the system is limited when considering the array of broadcast services now widely available through community antenna type cable television systems commonly known as CATV systems.

The capability of transmitting and distributing digital signals at high bit rates has become a necessity. Asynchronous transfer mode (ATM), an emerging packet switching technology, has been developed to transport large quantities of video data with high speed and flexibility. ATM can be made suitable for either point-to-point configurations or point-to-multipoint configurations. A number of recent patents have suggested transport of video, including broadcast video, using ATM. U.S. Pat. No. 5,260,783 to Dixit discloses a specific technique for digitizing video based on the detected degree of motion and transport of the encoded video information in ATM cell form. U.S. Pat. No. 5,027,400 to Baji et al. discloses a multimedia broadcast system utilizing ATM from the broadcast station all the way to the subscriber terminal.

ATM networks communicate all information in cells that comprise a well defined and size-limited header area and a user information, or payload, area. Standardized ATM cell format, CCITT.121/2, specifies a 5-byte header field and a 48-byte information or payload field. The header field carries information pertaining to ATM functionality, such as identification of the cells needed for routing purposes. Transfer is asynchronous in the sense that the recurrence of cells that contain information from any particular sender is not necessarily periodic. Each sending device using the ATM network submits a cell for transfer when it has a cell to send, not in accordance with a transmission time slot assigned to the device.

An ATM switch comprises a number of switching elements which act together to transport a cell from a switch input to the correct output. The switch performs two primary tasks: routing the transport of cells within the switch and translation of the header information in the cells for appropriate routing of the succeeding ATM cell receiving element.

ATM transport is relied upon in several network architectures that have come broadly to be called video dial tone networks. These networks offer a full range of broadcast video, interactive video, narrowband data and voice telephone services. Examples of such networks are disclosed in pending patent application Ser. No. 08/304,174, filed Sep. 12, 1994, entitled Level 1 Gateway for Video Dial Tone Networks, in pending patent application Ser. No. 08/380,758, filed Jan. 31, 1995, entitled VPI/VCI Administration, and in pending application Ser. No. 08/498,265, filed Jul. 3, 1995, entitled Downloading Operating System Software Through A Broadcast Channel. These applications and the present application are commonly assigned.

Video dial tone systems transport video signals that have been compressed and encoded in accordance with MPEG (moving picture experts group) algorithms. MPEG-2 is a second generation compression standard capable of encoding video program material into a 6 Mbits/sec bit stream. A number of 6 Mbits/sec channel streams are then packetized into a single higher rate signal transport stream. The conversion of MPEG-2 data into ATM cell format imposes additional overhead requirements that challenge the information-carrying capacity of the network. For transmission protocols that require a stream of continuous data, an ATM data stream carrying MPEG video data may need to be padded with ATM idle cells, or "dummy cells", in order to ensure proper synchronization with the physical layer. Such a data stream should also be able to carry as many program channels as possible.

For simultaneously carrying a large number of channels, the video dial tone networks use fiber optic transmission systems having bandwidth capabilities ranging from 155.52 to 2,488.32 Mbps. As disclosed in the application Ser. No. 08/498,265, which is hereby incorporated by reference, a super trunk transmitter at the source end of a fiber multiplexes a plurality of digital input streams up to the optical rate. The system has a capacity of applying sixteen of such digital input streams to the super trunk transmitter, each such stream transmitting at a DS-3 rate with a capacity of up to six digitally encoded video programs. The sources of the input streams may comprise any combination of separate video input providers (VIPs). As many super trunk transmitter and fiber arrangements can be provided as are needed to deliver all available video programs. At the downstream ends of the fiber network super trunk receivers provide routing of video channels to appropriate host digital terminals for distribution through optical network units and electrical transmission to end user locations.

Digital signal transmission replaced prior transport arrangements wherein baseband video channels were multiplexed to a higher rate for optical transmission. Rather than digitizing a single baseband video channel and converting it to DS-3 transmission, an increase up to six channels for each DS-3 facility can be provided by compressing the baseband channels and then multiplexing. The use of DS-3 transmission at maximum capacity and then multiplexing several such bit streams into a higher rate bit stream places exacting requirements on the transport system. ATM DS-3 transmission, which is basically designed for an asynchronous mode, now must be utilized with precise frequency relationship among several bit streams without variance.

Under normal DS-3 standards, encoders may operate within a frequency tolerance of fifty parts per million. If DS-3 input streams to the video dial tone network differ in bit rates as little as one Hz, a loss of a bit will occur often enough to cause a slip in the signal that becomes unacceptably noticeable when the video signal is decompressed and displayed at the user end. An information frame will be lost when the receiving buffer exceeds its capacity, as would occur if the transmitter bit rate is greater than the receiver bit rate. Similarly, if the transmitter bit rate is less than the receiver bit rate, buffer storage would decrease to zero, causing a similar frame loss effect. As each information frame carries multiple video frames, a large number of bit errors are injected into the compressed video, disrupting several program channels.

For maximum bit stream utilization, therefore, all input signals must be precisely timed with effectively no tolerance for error. A formerly asynchronous mode must become highly synchronous in use. This requirement is further complicated by the fact that each of the six program channels of each DS-3 input stream, as well as each of the sixteen DS-3 input streams to the super trunk transmitter, may be provided by encoders from different VIPs. An individual VIP may have fewer than a full complement of programs. The system must be able to combine DS-3 streams that are not fully populated with other such streams, as well as fully utilized DS-3 streams, to transport up to the capacity of each transmission fiber. The likelihood that the exact same frequency will be used by different DS-3 clocks, without external synchronization, is small.

DISCLOSURE OF THE INVENTION

The present invention overcomes the above described difficulties by providing a digital communications system that efficiently transports communications data in ATM format from a plurality of information providers to a plurality of users. The digital broadband communications system of the present invention maximizes transport of the supply of ATM streams from a plurality of information providers to signal paths for distribution in a network.

These advantages are achieved in the present invention by a video dial tone network arrangement that synchronizes the timing among the various VIP multiplexers and super trunk transmitters. A preferred implementation comprises an ATM backbone network and a local loop distribution network. Although other local loop distribution networks may be used, the preferred implementation transports bit streams carrying a multiplex of ATM cell streams to each subscriber terminal. For example, to supply one broadcast program, the serving node of the local loop distribution network, called a host digital terminal (HDT), supplies the bit stream carrying the cells for the program to the terminal and supplies the terminal with the ATM header information for the program, to permit the terminal to decode the data from the cells carrying the program information.

The network of the present invention can transport a wide variety of information. For example, broadcast programs may be video, audio or data. For video or other broadband services, the information is digitized and packetized. An ATM multiplexer or the like then encapsulates the packets in the payloads of a number of ATM cells, adds the appropriate cell headers, and supplies the ATM cells to the ATM cell processing elements.

A timing signal generator, tied to the system clock standard provides synchronizing signals for each VIP multiplexer and super trunk transmitter so that all VIP source signals will be in synchronization. Digital bit streams produced by all VIPs can then be multiplexed in appropriate combinations to provide efficient program distribution without bit slipping and frames loss.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
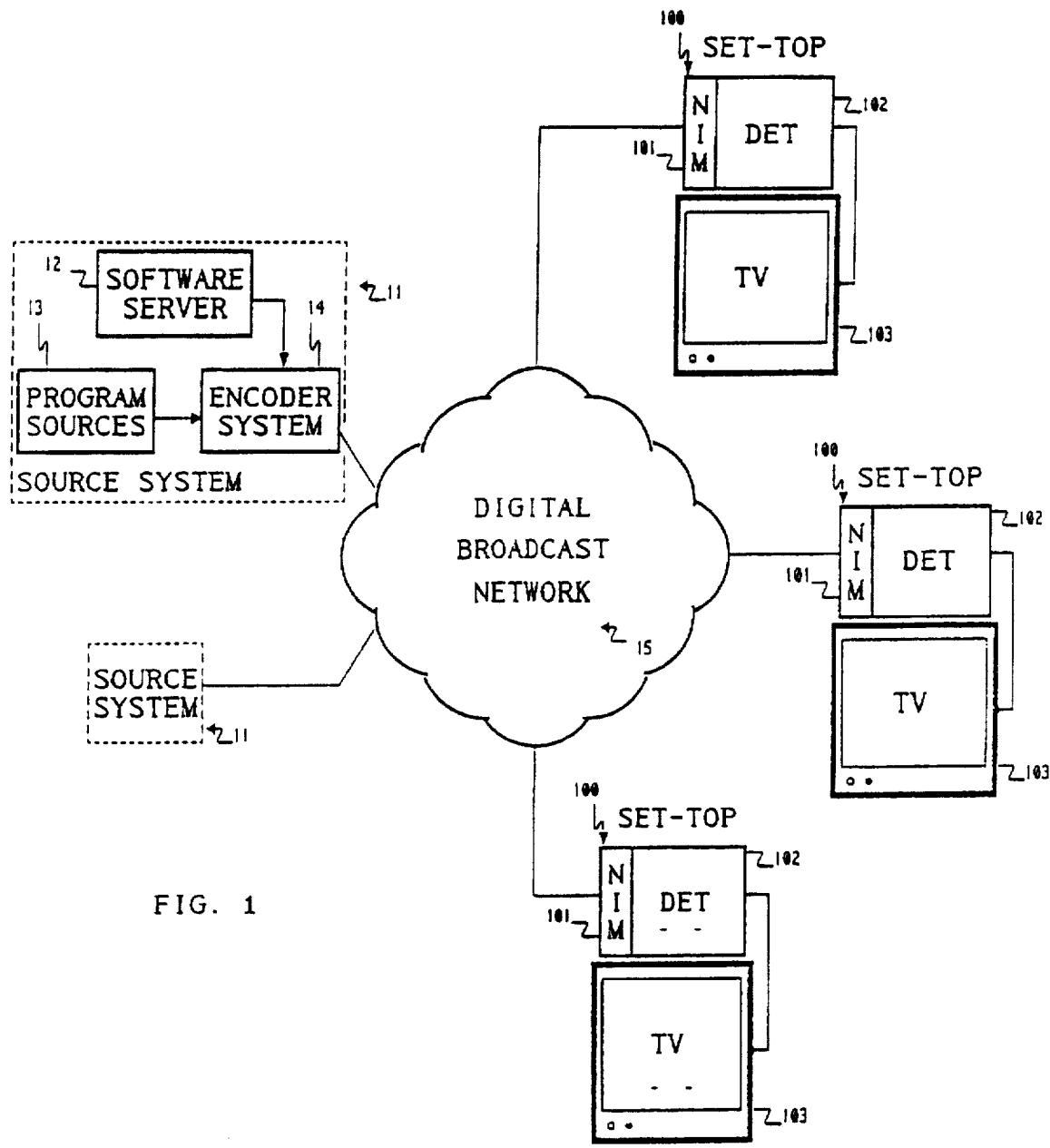
FIG. 1 is a simplified block diagram of a broadcast communication network using at least some ATM transport in accordance with the invention.

FIG. 1 is a high level functional diagram of a network providing broadcast and interactive broadband services, using ATM cell transport for at least the downstream broadband transmissions going all the way to the user terminal. ATM backbone network 15 receives digitized data streams in ATM cell format from a plurality of sources operated by one or more video information providers. The local loop distribution network supplies the ATM cells from each broadcast source to each set-top terminal 100 from which a subscriber requested the particular broadcast service.

Material intended for broadcast through the network is encoded and packetized in accord with a specified protocol or standard, such as DIGICIPHER™. The preferred embodiments utilize MPEG (moving pictures expert group) encoding. A source system 11 includes one or more program sources 14 and an encoder system 13 for encoding the program material in the desired standard format. Where the network utilizes another transport protocol such as ATM, the encoder also adapts the encoded information to the format utilized on the network 15. A software server supplies data to the encoder 14.

As illustrated, a plurality of source systems 11, 11' supply digitized material to the digital network 15 for broadcast. One service provider may operate a number of the source systems to provide a desired number of broadcast programs or channels. A plurality of video information providers (VIPs) may separately supply their own programming from one or more such sources. In the simplified example shown in FIG. 1, source system 11 offers a plurality of broadcast programs from sources 13 and broadcasts software for the downloading service. Other source systems such as system 11' may be identical to system 11 and offer both broadcast programming and software downloading.

In normal operation, the broadcast network supplies at least a selected program channel to the set-top terminal 100. The set-top terminal processes information from the selected channel to produce signals capable of presenting information from that channel to a user in humanly perceptible form, e.g. to drive a standard television set 103 to display selected video programming. The network interface module (NIM) 101 provides the actual physical connection to the network and the transport protocol processing (e.g. ATM). The DET 102 performs the actual decoding to produce the output signals from the information. The DET 102 also includes the primary intelligent control processor for overall control of the operation of the set-top terminal 100. A more detailed explanation of such operation is provided in the above referenced application Ser. No. 08/498,265.

Figure 2:
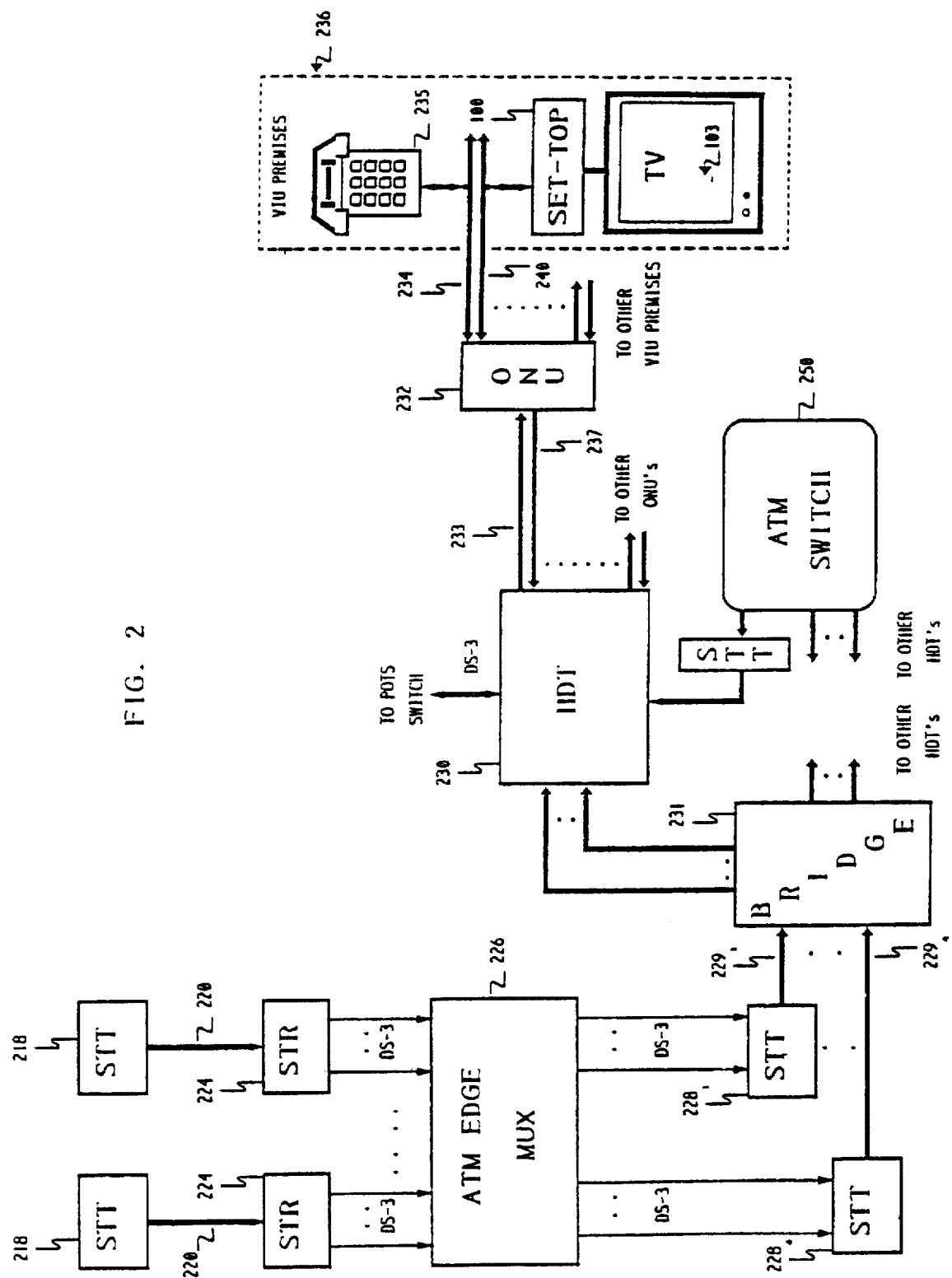
FIG. 2 is a block diagram of the digital broadcast network in accordance with a preferred embodiment of the invention.

FIG. 2 is more detailed diagram of an embodiment suitable for the digital broadcast network 15, shown in connection with the video information user equipment. The illustrated network provides transport for broadband services including broadcast video. The network may also provide IMTV type services, such as video on demand, interactive text services and voice telephone services.

The illustrated network comprises an ATM backbone network and a local loop network. For broadcast services, the ATM backbone network includes an ATM edge device 226 and optical fibers 220 from the VIP headends to that edge device. The ATM backbone network includes four optical fibers $229_1$ to $229_4$ carrying broadcast programming from the ATM edge device 226 to a large number of host digital terminals (HDT's) 230 of which only one is shown. For interactive multimedia television (IMTV) services, the ATM backbone network includes at least one ATM switch 250 that may be controlled as explained in the aforementioned application Ser. No. 08/498,265.

The local loop network consists of the HDT's 230, two-way optical fiber pairs between the HDT's 230 and optical network units 232 (ONU's), and coaxial cables 240 and twisted wire pairs 234 connecting the ONU's to the subscriber premises equipment. Control processor elements (not shown) within the HDT's 230 and a video administration module control the broadcast services. Signaling communications to the serving HDT 230 utilize a consumer electronics (CE) bus protocol. Signaling communications between the other nodes of the network may ride on an X.25 packet switched data network or be carried through ATM switch 250.

The preferred embodiment uses super trunk transmitters and receivers manufactured by Broadband Technologies, Inc. of Research Triangle Park, N.C. The preferred super trunk transmitters perform a bit stream interleave type multiplexing. The preferred super trunk transmitters (STT's) 218 are capable of receiving DS-3 bit streams from up to sixteen sources, for example up to sixteen source systems 11. Each super trunk transmitter 218 combines those DS-3 rate bit streams into a single higher rate bit stream, converts that electrical stream into an optical signal stream and transmits the optical stream over a fiber, such as 220. The optical fibers 220 each transport up to 16 DS-3 streams, wherein each DS-3 includes six 6 Mbits/s MPEG II encoded transport streams, for a maximum capacity on each fiber of 96 channels.

The trunk fibers 220 are routed to super trunk receivers 224, each of which recovers up to sixteen DS-3 rate bit streams from the corresponding optical signal stream. Each super trunk receiver 224 supplies each recovered DS-3 rate stream to one input node of the ATM edge multiplex device 226. The preferred ATM edge device 226 receives at least sixty-four DS-3 inputs from the STRs 224.

The ATM edge device 226 performs policing and grooming on the input ATM cell streams in a manner more fully explained in the aforementioned application Ser. No. 08/498,265. The ATM edge device monitors incoming DS-3 data streams and determines whether ATM cells within the data streams should be passed to the network or blocked and whether the data is appropriate. A specified six ATM cell streams may be combined by the edge device into a DS-3 bit stream for output on each DS-3 output port. This ATM cell mapping enables DS-3 ATM cell streams that are transmitted at less-than-full capacity on the trunk fibers 220 to be mapped onto output DS-3 streams operating at full capacity. Although each optical fiber 220 has a capacity of transporting up to 16 fully loaded DS-3 ATM streams, at least one optical fiber 220 from two or more VIPs typically may not be operated at capacity, for example, when broadcast VIPs do not offer an even multiple of six channels or when VIPs using the optical fibers have varying bandwidth requirements over time.

The ATM edge device may comprise a relatively small capacity ATM switch. A more detailed description of the ATM edge device and its operation is disclosed in commonly assigned U.S. Patent application Ser. No. 08/380,744, filed Jan. 31, 1995, the disclosure of which is incorporated herein in its entirety by reference.

The ATM edge device 226 outputs at least one DS-3 stream of combined ATM streams and preferably 16 such streams to each of four super trunk transmitters (STT's) $228_1$ to $228_4$. Each particular STT $228_1$ to $228_4$ combines the input DS-3 bit streams into an optical stream, in a manner similar to that of STTs 218, for transmission on one of the four fibers $229_1$ to $229_4$. Other protocols may be used on the fibers $229_1$ to $229_4$ and/or the network. The signal stream on each optical fiber $229_1$ to $229_4$ is applied to a bridge circuit 231 to supply the optical signal stream through corresponding trunk fibers to a large number of HDT's 230 distributed throughout the serving area. The bridge circuitry includes passive bridging elements and may include active bridging elements.

The preferred embodiment utilizes HDTs manufactured by Broadband Technologies, Inc. of Research Triangle Park, N.C. Each HDT 230 handles up to 256 subscribers by switching DS-3 bit streams carrying selected program channels onto optical fibers to up to 32 optical network units 232 (ONUs). The operations of each HDT 230 are controlled by data tables stored within the HDT. The video information providers (VIPs) provision various services for their subscribers by establishing appropriate mapping and profile data in the tables in the HDT's 230. The ONUs 232 transfer the DS-3's over respective coaxial cables to subscriber terminals for display on associated television sets.

The downstream optical fibers 233 from the HDT 230 to each connected ONU preferably transport 24 DS-3 ATM cell streams. Together, the downstream fiber 233 and upstream fiber 237 also provide transport for 2-way telephone communications and 2-way signaling channels. In an alternate embodiment, the network might use a single fiber between the HDT and each ONU and provide both downstream traffic and upstream traffic on that one fiber.

Figure 3:
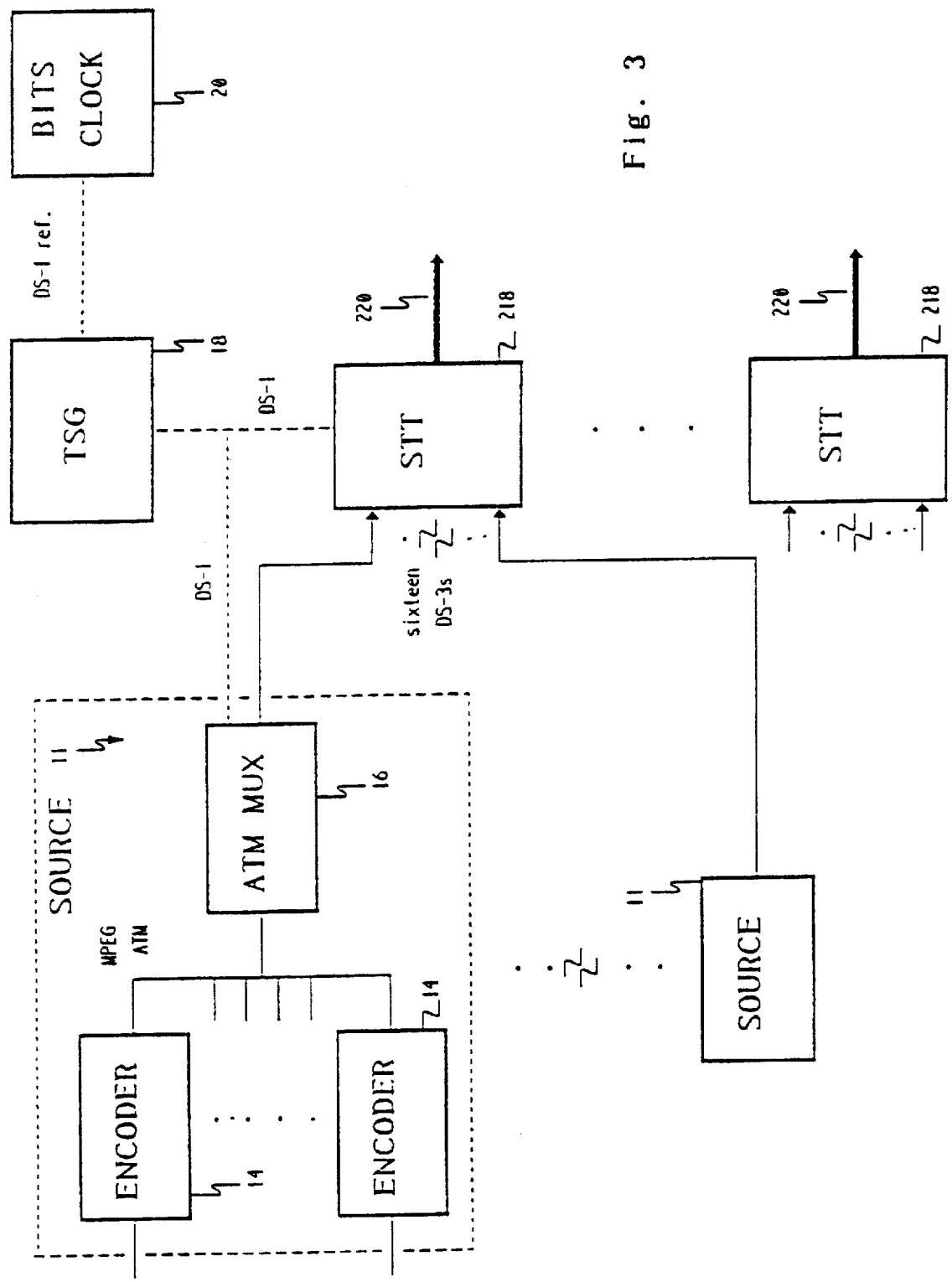
FIG. 3 is a partial block diagram representation of the VIP connection to the super trunk transmitters and the digital broadcast network in accordance with the preferred embodiment of the invention.

FIG. 3 is a more detailed partial block diagram representation of the VIP connection to the super trunk transmitters 218 and the digital broadcast network. As described above, the super trunk transmitter has the capacity to receive sixteen DS-3 ATM bit streams. Merely by way of example, each of these inputs is depicted as originating from a VIP. Sixteen such sources are depicted, one source block being shown in greater detail. In practice, the up to six program channels that may comprise any particular DS-3 STT input stream may be provided by one VIP or more than one VIP.

Each encoder 14 receives an input of baseband audio/video information, e.g. in NTSC signal format and encodes received signals in real time to MPEG ATM format. Thus, one baseband program signal is converted into digitized and compressed form in accord with the selected protocol. The encoder may be a commercially available unit such as manufactured by Divicom.

Timing signal generator 18 is linked with each multiplexer 16, as well as the super trunk transmitters 218, to provide a common clock reference to ensure more accurate synchronization than is available through the acceptable DS-3 tolerance. The sixteen DS-3 bit streams from each source 11 are each applied to an input of a super trunk transmitter 218. The STT 218 bit interleaves up to sixteen DS-3 ATM cell streams into one higher rate bit stream and converts the electrical signals to optical signals for transmission over a trunk fiber 220.

Timing signal generator (TSG) 18 derives its extremely accurate clocking signal from a master input, such as a GPS or LORAN receiver, through the Building Integrated Time Supply (BITS) clock 20. The BITS clock is used as a frequency standard by the broadcast and telephone communication network. The master input may comprise a Stratum 1 source of high accuracy at a DS-1 rate. The TSG 18 typically will have a main and backup reference input, one of which will be copied and directed to each of the multiplexers and STTs in the source circuitry at the input to the digital broadcast network, as shown by the dotted line connections. The provision of the TSG at the VIP end avoids the need for a separate high accuracy frequency source standard for each element to be synchronized. The TSG may be commercially available equipment such as Telecom Solutions model DCD-400. Local oscillators are included in the unit as backup in case the master reference signal is temporarily lost. The TSG includes a plurality of DS-1 output cards that each provide ten output timing signals. Preferably, each source system would be assigned a single output card, while two output cards are assigned to each STT.

Figure 4:
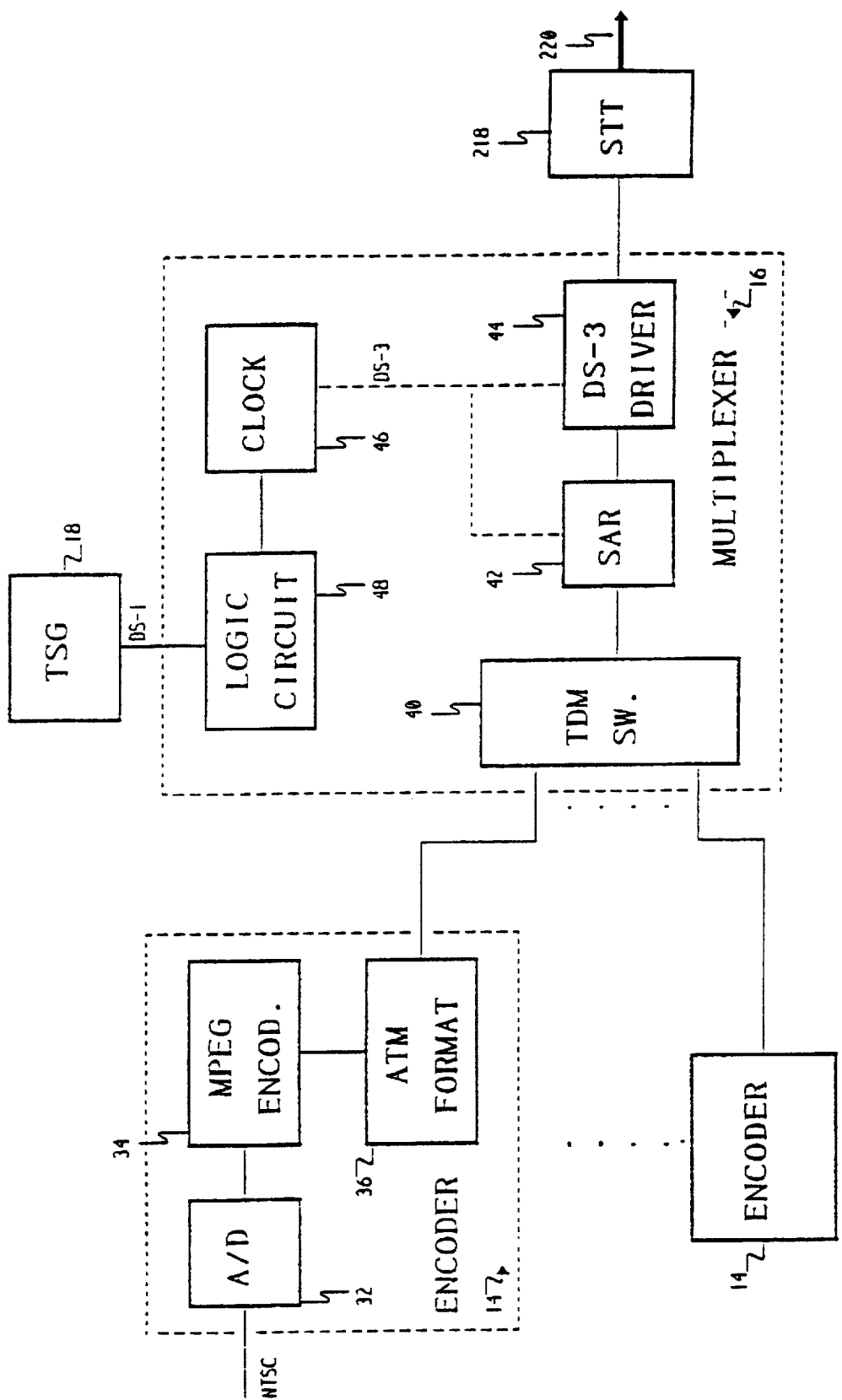
FIG. 4 is a more detailed diagram of the encoder and multiplexer portions of the source shown in FIG. 3.

FIG. 4 is a more detailed diagram of the encoder and multiplexer portions of the source 11 of FIG. 3. Each encoder 14 comprises an A/D converter 32 connected at its input to receive a baseband analog (NTSC) signal. The output of the A/D converter is fed to MPEG encoder 34 which, in turn, is connected to output its encoded signals to ATM format unit 36. The 6 Mbps data stream output from this encoder and the five outputs from the other encoders in the source system are input to the ATM multiplexer 16.

In the preferred implementation, the MPEG encoders 34 operate in accord with MPEG II. A detailed discussion of the standard may be found in International Organisation for Standardization Organisation Interationale de Normalisation, "Coding of Moving Pictures and Associated Audio", ISO/IEC JTC/SC29/WG11, CD ISO/IEC 1-13818, Feb. 1994. MPEG is a bi-directional predictive coding compression system, utilizing discrete cosine transformation (DCT) processing to digitize and compress video information. For video information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference (I) frame, this specific number also is set in the MPEG syntax. Information from previous video frames as well as later video frames is used in formulating the prediction. "Delta" or "B" frame information is developed for coding the video frames between the actual and predicted frames, also by looking at frames in both directions. Rather than updating a whole frame, only the changed (or delta) information is provided for the delta video frames. Typically, between I frames, the frame sequence consists of a repetitive succession of two B frames followed by one P frame.

The MPEG II standard also specifies digitizing and compressing techniques for accompanying audio information. The MPEG II standard provides a standardized format for packetizing the compressed audio and video information and for other data. Under the MPEG II standard, incoming individual video signals and related audio signals are encoded and packetized into respective Video and Audio Packetized Elementary Streams (PES). The video and audio PES's from one or more sources of video programming may be combined with similarly packetized data into a transport stream for transmission or storage.

Each frame of compressed audio or video program information is broken down into a series of transport packets. Data, e.g. in Ethernet protocol form, is also repacketized into MPEG II transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of fifteen frames for one-half second of video (one I frame and a number of P and B frames), breaks down into approximately 4000 transport packets.

The MPEG II standard also permits transport of private or user data as payload information in the 188 byte packets. Each packet includes a packet identifier (PID) value, and the encoder or data module inserts the assigned PID into the packet as part of the packet formatting process. Different PID values are assigned to different programs and content. For example, one program may have a first PID for video, a second PID for audio and a third PID for related data (e.g. closed captioning). The same stream may also contain private data not directly related to the program, e.g. application or operating system software, and a different PID is assigned to packets transporting that data.

The MPEG encoded packet stream is fed to ATM apparatus 36, which inserts the received information into ATM formatted cells. The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. The MPEG II bit streams are converted into cellular payload data, and cell headers are added. A number of techniques can be used to adapt the transport packets into ATM cells, the preferred techniques being described below merely by way of example.

As noted above, each MPEG packet consists of 188 bytes, whereas each ATM cell includes 48 bytes of payload data. The ATM multiplexer which maps the MPEG packets into ATM cells preferably uses two different adaptations to encapsulate MPEG II packets in ATM cells. A first adaptation maps one 188 byte MPEG packet into five ATM 48 byte cell payloads while a second adaptation maps two 188 byte MPEG packets into eight ATM 48 byte cells payloads. MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR values need to be encoded and transported quickly. To avoid delaying first packets containing a PCR while processing a second packet, the present system maps first packets containing a PCR immediately, using the five cell adaptation procedure. In a typical video transmission, the PCR is present in approximately 10 out of every 4000 MPEG II packets. Also, at least some of those 10 packets will arrive as the second packet of a pair. Consequently, only a very small number of packets are mapped using the less efficient 5-cell adaptation.

Each MPEG type real time encoder 32 supplies a stream of MPEG II packets to the ATM format unit 36. Flags in the adaption field (if any) in the first packet are checked to determine if that packet includes a program clock reference (PCR) value. The five cell adaptation is applied to first packets containing a program clock reference (PCR) value. The eight cell adaptation to pairs of cells wherein the first packet does not contain a program clock reference (PCR) value. Packets containing private data, such as applications and operating system software, will not contain a PRC flag.

For each type of adaptation, the ATM format unit will first convert the source packet or pair of packets into a single ATM adaptation layer 5 (AAL5) packet. As part of this conversion, the apparatus will add an AAL5 trailer, either at the end of the single packet or at the end of the pair of packets. The actual trailer consists of eight bytes of data, including four bytes of cyclic redundancy check (CRC) data, user information (e.g. length), etc.

For a five cell adaptation, the AAL5 packet consists of a single MPEG packet of 188 bytes and an 8 byte AAL5 trailer, for a total of 196 bytes. To map this packet into ATM cells, the AAL5 packet is also padded with 44 bytes after the trailer, for a total of 240 bytes of payload data. The AAL5 packet (240 bytes) is broken down into five 48-byte payloads and combined with appropriate 5 byte headers to each payload to thereby form five 53-byte ATM cells.

The ATM multiplexer 16 performs a multiplexing function to combine cell streams carrying payload data from the encoder sources into a higher DS-3 rate bit stream. The multiplexer comprises a time division multiplex switch (TDM) 40 having input ports connected to receive signals from the encoders 14. Segmentation and reassembly unit (SAR) 42 is coupled between the TDM switch 40 and DS-3 driver circuit 44. SAR 42 and DS-3 driver 44 receive synchronization signals driven by clock 46 and logic circuit 48.

In operation, TDM switch 40 will time division multiplex the input signals from the six encoders. For maximum usage and efficiency of the network, each of the encoders preferably will be operational to provide six video input channels. In practice, a given VIP source system may not be fully utilized as one or more encoders will not receive program input signals. An information provider may not have an exact multiple of six programs to offer nor be readily able to make available the unused encoders in a source system to other providers. The TDM switch will multiplex any number of the received input signals into the single data stream.

SAR 42 provides the DS-3 framing protocol and appropriate bit stuffing to expand the 36 Mbs input stream from the six 6 Mbs source signals (or fewer if not all encoders are utilized) to the full DS-3 rate of 44.736 Mbs. DS-3 driver circuitry transmits the output stream to the STT 218.

Logic circuit 48 comprises divider and multiplier circuits to derive a precise DS-3 rate signal from the accurate DS-1 rate signal received at the logic circuit from TSG 18. The DS-1 reference signal of 1.544 Mbs. is first divided by 193 and then multiplied by 5592 to obtain an exact DS-3 rate signal of 44.736 Mbs. that is synchronized with the received DS-1 reference signal. The logic circuit output is applied to clock circuit 46 that contains a phase locked loop oscillator circuit. The output of this circuit is applied as a timing reference, at a precise DS-3 rate, to the SAR 42 and the DS-3 driver 44.

Figure 5:
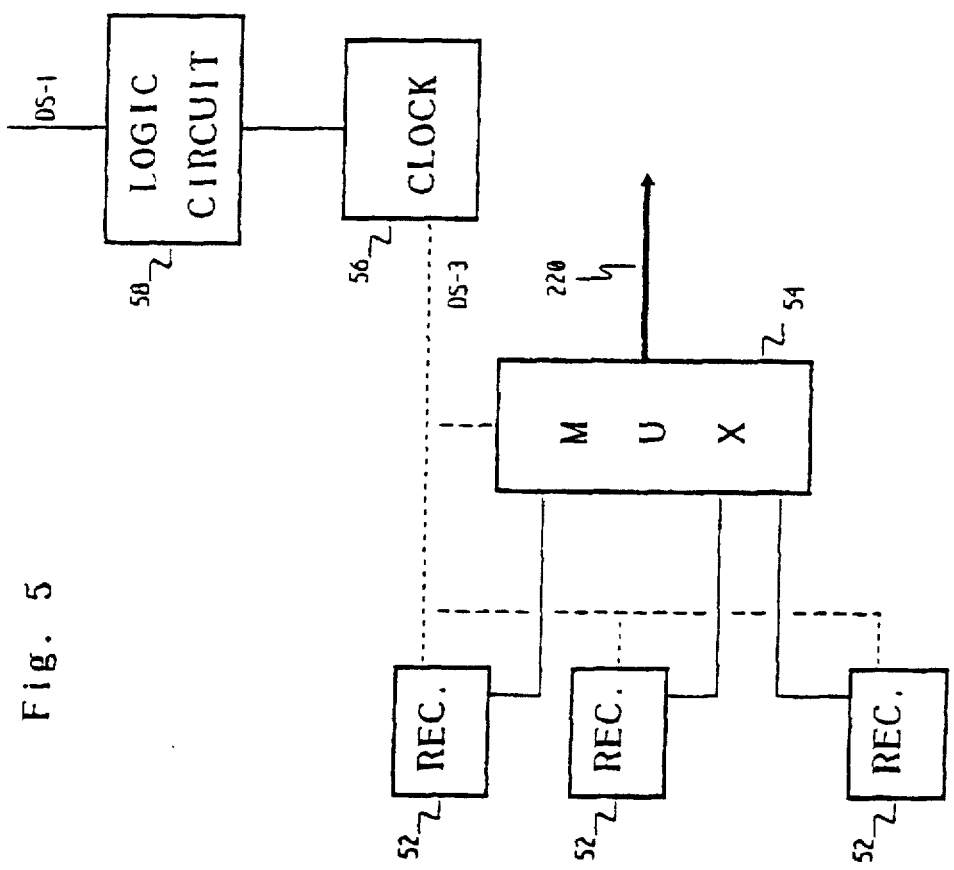
FIG. 5 is a block diagram of a super trunk transmitter in accordance with the invention.

As each of the sixteen source ATM multiplexers are locked to the same timing standard, STT 218 will produce a synchronized data stream. All other source systems likewise will be linked to the TSG 18, thereby synchronizing all STTs in the network. Each super trunk transmitter in the system receives the same timing signals, a block diagram of a typical STT being shown in FIG. 5.

The STT comprises at least sixteen digital receiver units ported to receive the sixteen source DS-3 signals illustrated in FIG. 3. These units may be individual circuits or receiver cards located in sixteen slots of a processing unit. The digital receiver units 52 are clocked at a DS-3 rate to feed the sixteen input signals in parallel to the multiplexer 54 in successive DS-3 bit transmission periods. Multiplexer 54 bit interleaves the incoming signals to provide a single higher rate data stream that is output to fiber trunk 220. Each of the sixteen received input signals is serially clocked in order at the multiplexer and fed to the multiplexer output, the sixteen output signals serially supplied during a single DS-3 bit transmission period. The same sequence occurs during the next DS-3 bit transmission period.

As explained above, each of the sixteen input signals comprises up to six program channels to provide a maximum of ninety six program channels. To ensure accuracy, therefore, each of the sixteen input signals must be synchronized so that the bit signal from the appropriate bit stream of each input will be applied at each DS-3 rate clocking of the receivers. This timing must be coordinated with the timing signals that drive source system encoders and multiplexers. In addition, each of the DS-3 clocking signals in the STT must be synchronized with the timing signals of the receiver clocking to obtain an accurate data read out to the output.

Logic circuit 58 and clock circuit 56 derive a DS-3 synchronization signal from the TSG DS-1 timing standard in the same manner as logic circuit 48 and clock circuit 56 of FIG. 4. Divider and multiplier circuits of the logic circuit convert the frequency rate whereby phase lock loop oscillator circuitry of the clock circuit provide DS-3 timing signals, as indicated by the dotted lines, to the digital receiver units and the multiplexer. In like manner, other elements of the network, such as the ATM edge multiplexer and the bridge shown in FIG. 2, are synchronized to the same DS-1 standard.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims. For example, the supertrunk and ATM multiplexers shown in FIGS. 2 and 3 may be optical devices that operate in SONET transmission protocol.

We claim:

1. A video communication system comprising:
   a plurality of user terminals;
   a digital broadcast network connected to said user terminals; and
   a plurality of video information sources, having inputs derived from respective video information providers, coupled to said digital broadcast network, wherein each of said sources comprises a plurality of encoders and an asynchronous transport mode (ATM) processing element for converting said video information sources from analog to digital format signals and combining said signals into a single digital ATM stream; and said system further comprises a timing signal generator having a reference timing output coupled to said encoders and to said ATM processing element.

2. A video communication system as recited in claim 1, wherein said timing signal generator has an input connected to a master reference clock of the digital broadcast network.

3. A video communication system as recited in claim 1, wherein an output of said ATM processing element from each of a plurality of said sources is connected to a super trunk transmitter.

4. A video communication system as recited in claim 3, wherein said super trunk transmitter is coupled to said reference timing output of said timing signal generator.

5. A video communication system as recited in claim 3, wherein said ATM processing element comprises a multiplexer and said single digital ATM stream is transmitted at a bit rate of Digital Service, level three (DS-3).

6. A video communication system as recited in claim 5, wherein said super trunk transmitter comprises a multiplexer for combining signals received from said plurality of said sources into a digital stream at a rate higher than DS-3 level.

7. A video communication system as recited in claim 5, wherein said encoder comprises an analog to digital converter having an input for receiving NTSC signals;

an MPEG encoding unit connected to said analog to digital converter; and an ATM formatting unit connected to said MPEG encoding unit.

8. A video communication system as recited in claim 5, wherein said multiplexer comprises a TDM switch having inputs for receiving signals from said encoders;

a segmentation and reassembly unit for setting DS-3 transmission protocol; and receiving means for receiving timing signals from said timing signal generator.

9. A video communication system as recited in claim 8, wherein the signals from said timing signal generator are at a DS-1 standard and said receiving means comprises a logic circuit for converting received signals from said timing signal generator to DS-3 rate timing signals; and a clock circuit having an input connected to said logic circuit and an output connected to said segmentation and reassembly unit.

10. A video communication system as recited in claim 3, wherein said digital broadcast network comprises an ATM edge multiplexer having a plurality of inputs for receiving digital signals from a plurality of super trunk transmitters, said super trunk transmitters each coupled to a plurality of said video information sources;

at least one host digital terminal for routing digital streams transmitted from said ATM edge multiplexer to said user terminals.

11. A video communication system as recited in claim 1, wherein said encoders are connected to said inputs and at least one of said sources comprises encoders connected to inputs from a plurality of said video information providers.

12. A method for delivering video programs originating from a plurality of video information providers through a communication network to a plurality of users comprising the steps of:

encoding each program into MPEG format signals;

formatting said MPEG format signals for each program into an ATM protocol data stream;

combining a plurality of said ATM protocol data streams as respective digital program channels in a common bit stream at a DS-3 rate;

mixing a plurality of the DS-3 rate common bit streams into a higher rate digital bit stream; and transmitting said higher rate digital bit stream for distribution of digital program channels to users; wherein said combining step comprises the steps of synchronizing said ATM protocol data streams and multiplexing said ATM protocol data streams.

13. A method for delivering video programs as recited in claim 12, wherein at least one of said plurality of said DS-3 rate common bit streams contains fewer digital program channels than can be transmitted in the bit stream at maximum DS-3 rate capacity and said mixing step comprises grooming said plurality of DS-3 rate common bit streams; and multiplexing digital channels of said DS-3 rate common bit streams into to said higher rate digital bit stream at maximum capacity thereof.

14. A method for delivering video programs as recited in claim 12, wherein said synchronizing step comprises generating a DS-1 rate standard signal;

converting said DS-1 rate standard signal to a reference DS-3 frequency rate signal; and applying said reference DS-3 frequency rate signal in said multiplexing step, whereby accurate time frame alignment of ATM cells for each of said ATM protocol data streams is obtained.

15. A method for delivering video programs as recited in claim 14, wherein said mixing step comprises applying said reference DS-3 signal as a timing standard.

16. A method for delivering video programs as recited in claim 12, wherein at least one of said plurality of said DS-3 rate common bit streams contains digital program channels that originate from different video information providers.

17. A method for delivering video programs as recited in claim 12, wherein transmitting step comprises contemporaneously distributing at least one of said digital program channels to a plurality of said users.

18. A digital broadband communication system for transporting broadband data from a plurality of information providers to at least one subscriber, each of said information providers outputting an asynchronous transfer mode (ATM) data stream, comprising:

a plurality of video information sources, having inputs derived from respective information providers, each of said sources comprising a plurality of encoders and an asynchronous transport mode (ATM) processing element for converting said video information sources from analog to digital format signals and combining said signals into a single digital ATM stream in DS-3 format;

a plurality of super trunk transmitters, each connected to receive a plurality of said single digital ATM streams from said sources, each said super trunk transmitter comprising a multiplexer for combining the received plurality of DS-3 streams into a higher rate bit stream for transmission on an optical fiber;

a plurality of receivers adapted to receive optical fibers carrying said higher rate bit streams from said super trunk transmitters, said receivers outputting corresponding ATM data streams in DS-3 format;

an ATM edge device adapted to receive said ATM data streams from said plurality of receivers, said ATM edge device comprising a plurality of DS-3 input ports corresponding to a maximum capacity of DS-3 streams output by said receivers from said corresponding optical fibers, said DS-3 input ports adapted to receive said respective ATM broadband data streams in DS-3 format, an ATM processor coupled to said DS-3 input ports, and output ports connected to said ATM processor;

a timing signal generator having a reference timing output coupled to said encoders and to said ATM processor;

switching means for supplying at least one selected group of said ATM cells corresponding to a selected one of said information providers from one of said ATM output streams to said at least one subscriber, and a plurality of optical network units supplying said assigned ATM cells from said switching means to corresponding subscribers.

19. A digital broadband communication system as recited in claim 18, wherein said timing signal generator is connected to a DS-1 standard and comprises a logic circuit for converting received DS-1 signals to DS-3 rate timing signals; and a clock circuit having an input connected to said logic circuit and a plurality of outputs connected to said encoders and said ATM processor.

* * * * *